March 6, 1956 F. O. RINGLEB 2,737,357
HYDRAULIC JET CATAPULT WITH AUTOMATIC JET CONTROL
Filed Oct. 17, 1952 2 Sheets-Sheet 1
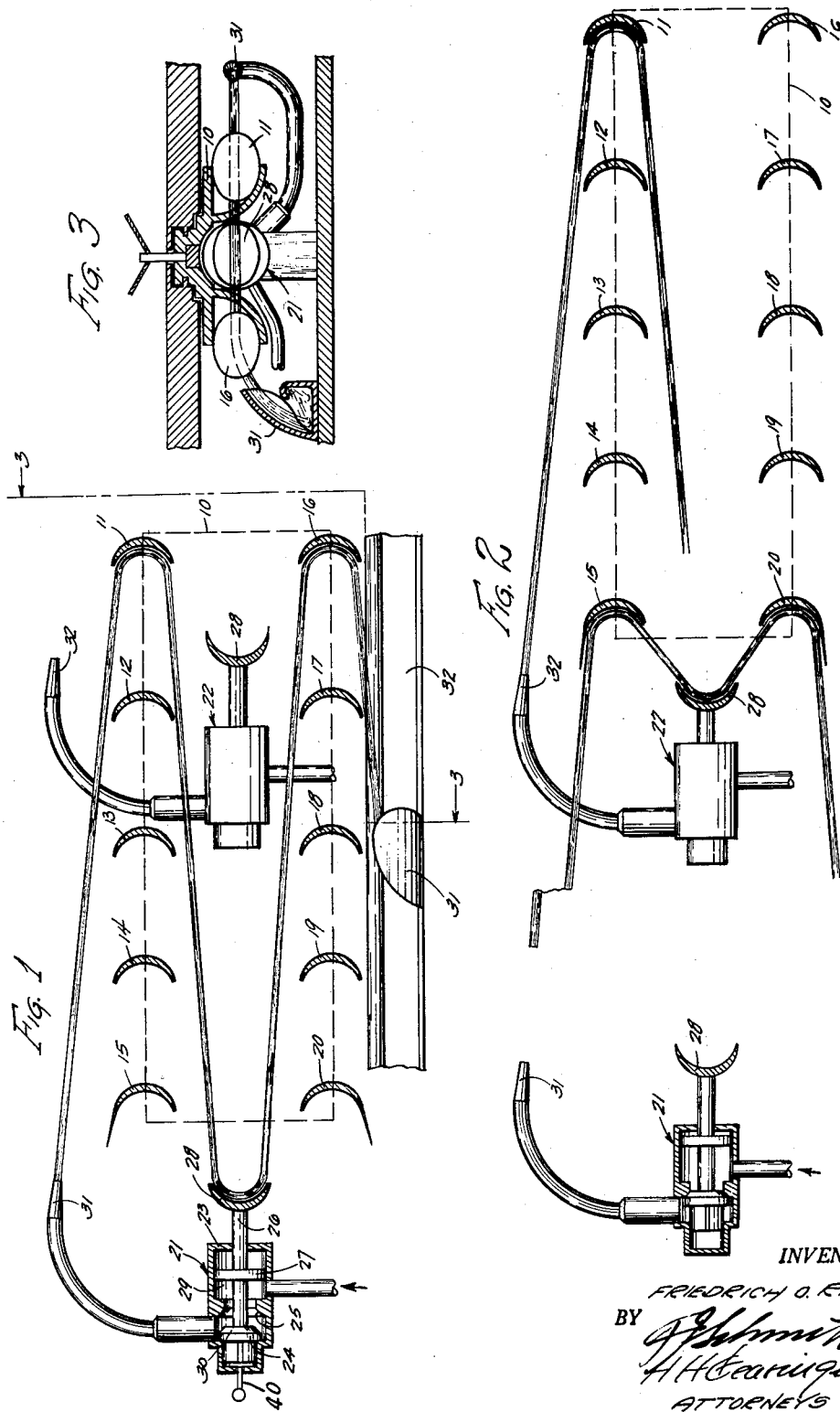
INVENTOR.
FRIEDRICH O. RINGLEB
BY
ATTORNEYS March 6, 1956 F. O. RINGLEB 2,737,357
HYDRAULIC JET CATAPULT WITH AUTOMATIC JET CONTROL
Filed Oct. 17, 1952 2 Sheets-Sheet 2
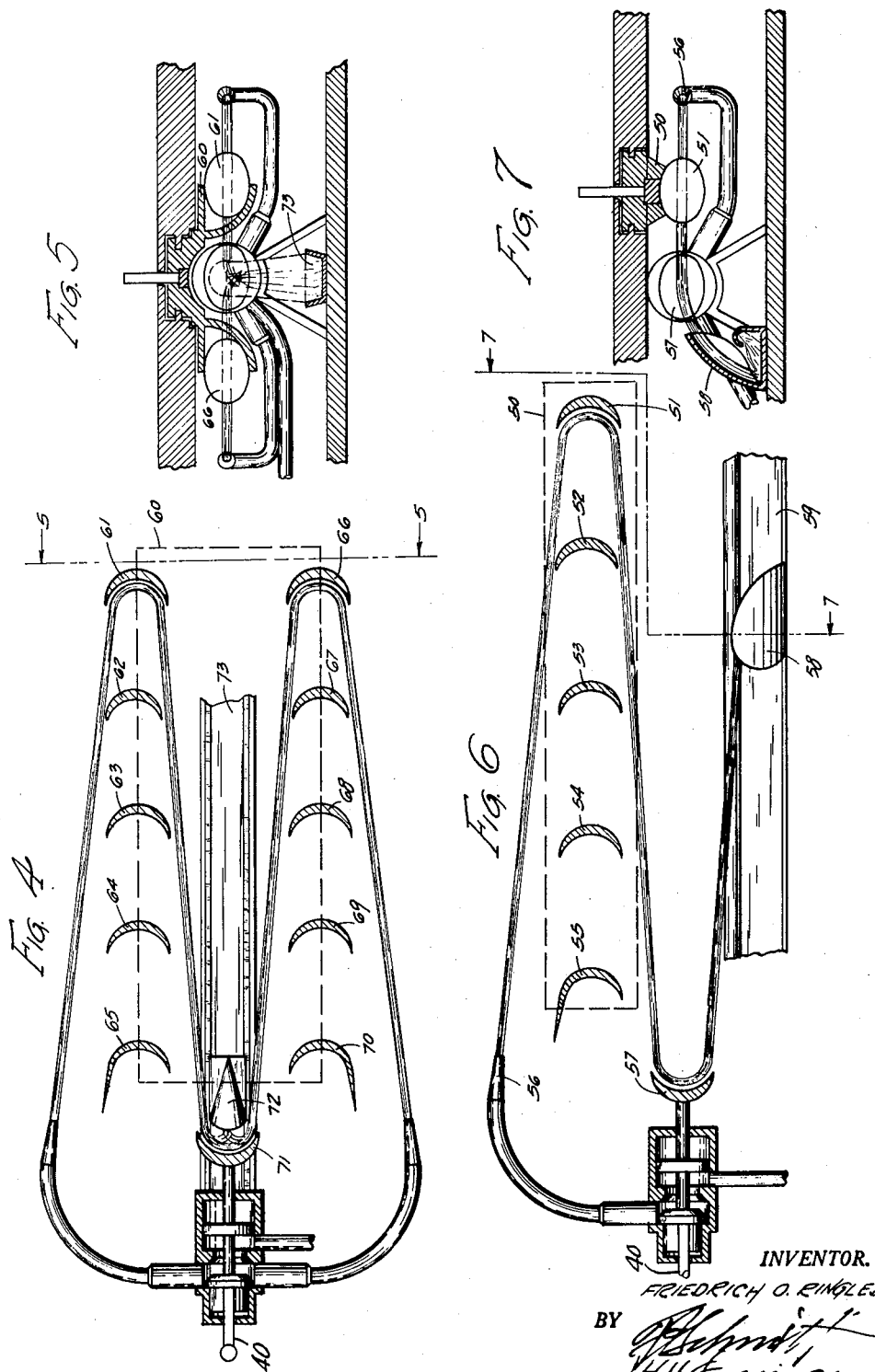
INVENTOR.
FRIEDRICH O. RINGLEB
BY
ATTORNEYS

United States Patent Office 2,737,357
Patented Mar. 6, 1956

2,737,357

HYDRAULIC JET CATAPULT WITH AUTOMATIC JET CONTROL

Friedrich O. Ringleb, Woodbury Heights, N. J., assignor to the United States of America as represented by the Secretary of the Navy Application October 17, 1952, Serial No. 315,441

12 Claims. (Cl. 244—63)

(Granted under Title 35, U. S. Code (1952), sec. 266)

The invention described herein may be manufactured and used by or for the Government of the United States of America for governmental purposes without the payment of any royalties thereon or therefor.

This invention relates to the art of carrier based aircraft launching and specifically to a hydraulic jet system for driving a catapult shuttle and to means for controlling the hydraulic jets.

It is an object of this invention to provide a hydraulic-jet driven shuttle which will operate efficiently at speeds and under loads encountered in lauching carrier based aircraft.

It is another object of the invention to teach means for automatically controlling the jets in a manner to reduce to a minimum the quantity of water required and to thereby raise the overall efficiency of the system.

Other objects and many of the attendant advantages of this invention will be readily appreciated as the same becomes better understood by reference to the following detailed description when considered in connection with the accompanying drawings wherein:

Figure 1 is a plan view of the preferred embodiment of the invention showing two of the valves and nozzles in the series, Figure 2 is a plan view of the preferred embodiment with some parts omitted taken shortly after the instant the jet from one nozzle is cut off and a jet starts to flow from the next nozzle in the series, Figure 3 is a section on line 3—3 of Figure 1 with the inoperative valve and jet being omitted for clarity.

Figure 4 is a plan view of a modified form of the invention.

Figure 5 is a sectional view taken on line 5—5 of Figure 4.

Figure 6 shows a further modified form of the invention and

Figure 7 is a sectional view taken on line 7—7 of Figure 6.

The systems employed for launching aircraft from carrier ships comprise generally a shuttle which is driven and accelerated along the deck of the carrier by some motive means, a source of power for the motive means and a braking and retracting system for the shuttle. The aircraft is towed behind the shuttle by means of a cable and is catapulted off the ship as the shuttle reaches the end of its stroke and is stopped by the braking means.

Presently common types of motive means for catapults include the slotted cylinder type in which a piston is driven through a tube by compressed air, steam, or expanding gases from burning powder and the electro-magnetic type. As the piston moves along in the slotted cylinder type, the slot behind the piston is closed by a sealing strip. A system of cables and sheaves may be interposed between the pistons and the shuttle. Difficulties are encountered in obtaining a good seal due to vibrations and malfunctioning of the sealing strip and with flame formations and after-explosion when powder is used as a fuel. Furthermore, especially where intermediate cables are used, extremely heavy braking loads are encountered and a serious problem of braking is presented. Since the braking engine must also be accelerated the percentage of ouput applied to the useful load is further reduced. The electro-magnetic type is prohibitively expensive.

Present hydraulic catapults utilize fluid pressure to drive a piston through a tube. Attempts to increase performance above a certain limit require such an increase in size and weight that the equipment becomes impractical. One of the chief faults with previously attempted hydraulic jet catapults has been the tremendous requirement of water resulting in low efficiency of the system. Another difficulty with prior attempts in hydraulic jet catapults is the long stroke necessary in order to reach the desired velocity because of decreasing acceleration as the shuttle approaches the end of its stroke.

Applicant has solved some of the problems of using a hydraulic system by providing a series of jets along the runout path of the shuttle so that the acceleration of the shuttle can be maintained practically constant over its entire stroke without requiring prohibitive quantities of water, by providing means for controlling the operating time of each jet so that waste is reduced to a minimum and by providing for multiple stages of buckets so that more of the energy of the jets is utilized and the efficiency of the system is relatively high whereby good operation is obtained with pressures and quantities of water within practical limits.

Fundamentally, the system employed by applicant resembles a hydraulic impulse turbine or Pelton wheel. In this catapult system a high velocity jet is directed successively from each of a series of nozzles along the runout path of the shuttle against a series of buckets attached to the shuttle. In this manner the shuttle is accelerated along the runout to launch an airplane. Braking and retraction of the shuttle may be accomplished by known conventional means or by utilizing jets directed against buckets on the forward end of the shuttle.

More specifically, the preferred arrangement comprises a shuttle 10, which carries a longitudinal row of buckets 11, 12, 13, 14 and 15 along one side and parallel thereto a similar row 16, 17, 18, 19 and 20 on the other side. Water from a high pressure source is conducted through a selected one of a series of valves including valves 21 and 22 to a corresponding nozzle included in a series of nozzles associated with the valves and arranged along the runout path of the shuttle. Each valve of the series includes a housing 23 and has a piston 24, a seat 25, a stem 26 and disc 27 located intermediate the length of the stem. On the end of the valve stem, externally of the housing, is fixed a bucket 28 for a purpose hereinafter explained. The area of the face 29 of disc 27 is greater than the effective area of the face 30 of the piston. Therefore the force due to the pressure of the fluid is greater in the direction tending to seat the piston and the valve remains normally closed. But when the jet reflected from one of the buckets on the shuttle impinges on the bucket on one of the valves, this balance of forces is disrupted and the valve is forced to its open position. The initial valve opening impulse must be supplied manually as by means 40 or by any other external means and from there on the operation is as follows. With the shuttle and the buckets carried thereby moving at a velocity $V_s$, a jet having a velocity $V_j$ leaves one of the nozzles 31 and strikes, for example, the bucket 11 causing the shuttle to be accelerated. The jet is reflected with a velocity $V_j - 2V_s$ toward the bucket on the valve 21 associated with the given nozzle causing the valve to remain open. By this time the bucket 12 has come into the range of the jet and the process is repeated this time involving bucket 12. It may be seen that each successive bucket will be brought into the range of the jet and the valve remains open until the last bucket 15 of the series is in the path of the jet. This bucket is designed so that the reflected jet will be directed against the bucket 28 on the valve 22 of the next succeeding nozzle 32 causing that valve to open. The jet from this nozzle will strike the bucket 11 and so on. Thus each jet will continue only while the buckets of the shuttle are in the range of that particular nozzle and while useful work may be obtained from the operation of that nozzle. The spacing between nozzles along the path of the shuttle is equal to the distance between the buckets 11 and 15 on the shuttle.

Applicant has found that one of the reasons for low efficiency in prior hydraulically operated catapults of this type has been the exhausting of the jet still containing energy of a useful level with respect to the velocity of the shuttle. Therefore, although the system may be used employing only a single cascade of buckets, applicant prefers to use two sets of buckets as are illustrated in Figures 1 and 2 of the drawings. In this form the jet which acts upon the buckets 28 of the valves is reflected by those buckets to the series of buckets 16, 17, 18, 19 and 20.

The jet striking the second bank of buckets is assumed to have the same velocity, $V_j - 2V_s$, as the jet leaving the first bank. Therefore the velocity of the jet with respect to the second bank of buckets is $V_j - 2V_s - V_s - V_j - 3V_s$. In order to obtain any benefit from use of the reflected jet the initial jet velocity in the preferred form must exceed $3V_s$.

Several forms of the single stage type may be devised. Two forms are shown in the drawings, Figure 4 and Figure 6. As illustrated in Figure 6 the shuttle 50 may be provided with a single bank of buckets 51, 52, 53, 54 and 55 and energy imparted to the shuttle by jets from a single series of nozzles including nozzle 56. The jet reflected from the buckets on the shuttle is directed onto a bucket 57 provided on each of the valves to hold the valve open in a manner as described above in regard to the preferred form.

As seen in Figure 4 the shuttle 60 is constructed as in the preferred form with a bank of buckets 61, 62, 63, 64 and 65 and a bank of buckets 66, 67, 68, 69 and 70. However, two nozzles are controlled by each valve so that a jet is directed against a bucket on each side of the shuttle at the same time. The jets reflected from each of the opposing buckets strike the bucket 71 of a particular valve at the same time. This serves to neutralize the energy remaining in the jets to permit easy collecting of the exhausted water.

It may be seen that using a single bank of buckets the required initial velocity of the jets must be greater than twice the velocity of the shuttle in order that the reflected jet may operate the valves as described. Where a double bank of buckets is used the required initial velocity of the jet must be greater than three times the velocity of the shuttle, as shown above, in order to impart energy to the second set of buckets. To keep the runout path as short as possible and within reasonable limits, the rate of acceleration over the whole stroke of the shuttle should be kept constant. This may be done by a proper choice of the number and size of the nozzles.

Water for the jets may be supplied from a tank in which a high pressure initial air volume acts on the water in the tank and expands as water is used during the shuttle stroke. The initial pressure may be supplied by a diesel-type pump or by a powder charge acting on water in an accumulator under sea level. These power plants are mentioned by way of example only, and do not constitute a limitation on the invention, it being understood that any practical means of producing the required pressure may be employed.

The exhausted jet from either the system utilizing the deflected jet for acceleration or from the system wherein the jet acts on only one set of buckets is deflected downwardly by the last bucket it strikes and the water is then carried off in a drain-off duct with an appropriately formed deflector being provided to help collect the water.

Several arrangements are possible and examples are shown in the drawings. For example, in Figures 1 and 2 which illustrate the multiple stage form, the water is deflected downwardly from the bank of buckets including buckets 16, 17, 18, 19 and 20 and the deflector 31 helps to concentrate the stream of water which is carried away in the duct 32 located at one side of the apparatus. Two forms of the single stage system are shown. In Figures 6 and 7 a single series of nozzles is provided and the jet is deflected downwardly by the buckets 57 on the valves. Collection of the water is the same as in the multiple stage form described above utilizing deflector 58 and drain-off duct 59. A variation shown in Figures 4 and 5 employs a series of nozzles at each side of the valve. The jets are reflected from each set of buckets to the bucket 71 which diverts the water downward toward the reflector 72 which helps direct the exhaust into the drain-off duct 73.

From a theoretical analysis of the system in which it is assumed that a single jet of changing cross-sectional area acts upon a single bucket on the shuttle as the shuttle proceeds along the runout, applicant has obtained the following data.

With an initial jet cross-sectional area of 0.0750 square foot, an initial air volume in the tank of 600 cubic feet at an initial pressure of 7220 pounds per square inch the shuttle will be accelerated to 150 miles per hour in 240 feet by 207 cubic feet of water if the load is 100,000 pounds giving an overall theoretical efficiency of 37% without use of the reflected jet for propelling the shuttle, in other words where only a single bank of buckets is used. When the reflected jet is employed with a second bank of buckets, the shuttle is accelerated to 150 miles per hour by only 140 cubic feet of water with an efficiency for the system of 59% under the same initial conditions of pressure, volume of air, load and stroke of the shuttle and with an initial jet area of 0.0375 square foot.

A load of 25,000 pounds will be accelerated to 190 miles per hour in 240 feet with an efficiency of 55% by 86 cubic feet of water emitted by a nozzle providing an initial jet area of 0.0375 square foot where the initial tank conditions are 5940 pounds per square inch pressure and 150 cubic feet of air and only a single set of buckets is used. If the shuttle is provided with a double bank of buckets so that the reflected jet may be used for propulsion, the initial jet cross-section is reduced to 0.0188 square foot and the other conditions remaining the same the requirement of water is reduced to 69 cubic feet while the efficiency is raised to 84%.

Thus it can be seen that applicant has produced a hydraulic jet system for accelerating an aircraft launching catapult which will operate efficiently under conditions which can be practically produced.

Obviously many modifications and variations of the present invention are possible in the light of the above teachings. It is therefore to be understood that within the scope of the appended claims the invention may be practiced otherwise than as specifically described.

I claim:

1. In a hydraulic system for accelerating a shuttle along a predetermined path, a bucket on said shuttle, a jet flowing from a nozzle and impinging on said bucket to provide an accelerating force on the shuttle, a high pressure source of fluid for creating the jet, a valve interposed between said source of fluid and the nozzle for controlling the time of operation of the nozzle to create a jet and means for operating the valve, said bucket being curved to direct the fluid exhausted therefrom against the valve operating means to thereby open the valve.

2. In a hydraulic system for accelerating a shuttle along a predetermined path, a bank of buckets on said shuttle arranged in a line parallel to the path of the shuttle, a series of nozzles spaced along the path of the shuttle, a fluid jet flowing successively from each of said nozzles and impinging on said buckets to cause acceleration of the shuttle, a high pressure source of fluid for creating the jet, a series of valves each associated with one of said nozzles and being interposed between said source of fluid and the nozzles to control the time during which each nozzle will emit a jet and means for operating each valve associated with each valve, said buckets being curved to direct the fluid exhausted therefrom against the valve operating means for each associated valve to thereby open the valve controlling the nozzle from which the jet is emitted so that the operating time of each nozzle is limited to the time during which one of the buckets on the shuttle is in a position to be accelerated by the jet flowing from the particular nozzle.

3. In a hydraulic system for accelerating a shuttle along a predetermined path, a first bank of buckets on said shuttle arranged in a line parallel to the path of the shuttle, a series of nozzles spaced along the path of the shuttle, a fluid jet flowing successively from each of said nozzles and impinging on said buckets to cause acceleration of the shuttle, a series of valves each associated with one of said nozzles, a series of buckets operatively connected one to each of said valves, and a second bank of buckets on said shuttle parallel to said first bank, the jet flowing from the nozzles first striking one of the buckets comprising said first bank and being reflected to flow against one of the buckets on the valves and being again reflected to flow against one of the buckets comprising said second bank.

4. In a hydraulic jet system for accelerating a shuttle along a predetermined path, a first bank of buckets on said shuttle, a second bank of buckets on the shuttle parallel to said first bank, a jet flowing intermittently and successively from each of a series of nozzles placed along the path of the shuttle, a series of valves corresponding to the nozzles and arranged so that each valve controls the operation of a different one of the nozzles, a bucket on each of the valves and drain-off means for collecting the exhausted jet, the path of the jet being from one of the nozzles to one of the buckets comprising said first bank of buckets, from there to one of the buckets on the valves, then to one of the buckets comprising said second bank of buckets and finally into the drain-off means, the time of operation of each nozzle being limited to the time during which the shuttle is in such position that the jet reflected from the buckets of said first bank will flow against the bucket on the valve associated with that particular nozzle.

5. In a hydraulic system for accelerating a shuttle along a predetermined path, a bank of buckets carried on each side of said shuttle, a hydraulic jet directed against the buckets on one side of the shuttle, a hydraulic jet directed against the buckets on the other side of said shuttle, a high pressure source of fluid for creating said jets, and a valve simultaneously controlling the flow of fluid making up each of the jets, an additional bucket located between the two banks of buckets, said buckets in each bank curved to direct the existing fluid into the additional bucket.

6. In a hydraulic system for accelerating a shuttle along a predetermined path, a bank of buckets carried on each side of said shuttle, a first nozzle for directing a jet against the buckets comprising one of said banks of buckets, a second nozzle for directing a jet against the other of said banks of buckets, a high pressure source of fluid for creating said jets, a valve simultaneously controlling the flow of fluid to said nozzles and a bucket operatively connected to said valve, the jets being reflected from the buckets comprising each of said banks of buckets to flow against the bucket on the valve to thereby operate the valve.

7. In a hydraulic system for accelerating a shuttle along a predetermined path, a bank of buckets carried on each side of said shuttle, a first series of nozzles for directing a jet against the buckets comprising one of said banks of buckets, a second series of nozzles for directing a jet against the buckets comprising the other bank of buckets, a high pressure source of fluid supplying the fluid creating the jets, a series of valves each controlling simultaneously one each of the nozzles comprising said first and second series of nozzles, a bucket carried by each of said valves, the jets being reflected from the buckets comprising each of said banks of buckets to flow against the buckets on the valves to thereby operate the valves and drain-off means for carrying away the fluid leaving the buckets on the valves.

8. In a hydraulic system for accelerating a shuttle along a predetermined path, a bucket on said shuttle, a nozzle for directing a hydraulic jet against said bucket to provide an accelerating force on the shuttle, a high pressure source of fluid for creating the jet, a valve interposed between said source of fluid and the nozzle for controlling the time of operation of the nozzle to create a jet and valve operating means lying in the path of the fluid exhausted from the bucket on the shuttle.

9. In a hydraulic system for accelerating a shuttle along a predetermined path, a bank of buckets on said shuttle arranged from the front of the shuttle to the rear of the shuttle in the direction of travel thereof, a series of nozzles spaced along the path of the shuttle, a fluid jet flowing successively from each of said nozzles and impinging on said buckets to cause acceleration of the shuttle, a high pressure source of fluid for creating the jet, a series of valves each associated with one of the nozzles and being interposed between said source of fluid and the nozzles to control the flow of fluid through each nozzle and valve operating means on each valve, all but the rearmost of the buckets on the shuttle being constructed to direct the fluid exhausted from the bucket against the valve operating means controlling the valve from which the jet is flowing to thereby hold the valve open and the rearmost of said buckets being constructed to divert the fluid comprising the jet impinging thereon against the valve operating means for the next successive nozzle whereby a jet is emitted by successive nozzles as the shuttle progresses along its path.

10. A system as set forth in claim 9 wherein the valves include movable pistons and the valve operating means are buckets attached to the movable piston.

11. In a hydraulic system for accelerating a shuttle along a predetermined path, a bank of buckets on said shuttle arranged in a line parallel to the path of the shuttle, a series of nozzles spaced along the path of the shuttle, a fluid jet flowing successively from each of said nozzles and impinging on said buckets to cause acceleration of the shuttle, a high pressure source of fluid for creating the jet, a series of valves each associated with one of said nozzles and being interposed between said source of fluid and the nozzles to control the time during which each nozzle will emit a jet, each valve having a movable piston attached thereto, and a separate valve operating bucket associated with each valve attached to each of said movable pistons, said bank of buckets being constructed to direct the fluid jet impinging thereon against the valve operating bucket for the valve associated with the nozzle from which the jet is emitted so that operating time for each nozzle is limited to the time during which one of the buckets on the shuttle is in a position to be accelerated by the jet flowing from the particular nozzles.

12. In a hydraulic system for accelerating a shuttle along a predetermined path, a bank of buckets carried on each side of said shuttle, a hydraulic jet directed against the buckets on one side of the shuttle, a hydraulic jet directed against the buckets on the other side of the shuttle, a high pressure source of fluid for creating said jets, a valve simultaneously controlling the flow of fluid making up each of the jets, an additional bucket connected to the common valve means, said buckets in each bank curved to direct the exiting fluid into the additional bucket.

References Cited in the file of this patent

UNITED STATES PATENTS

| | | |
|---|---|---|
| 2,493,013 | Nelson | Jan. 3, 1950 |
| 2,493,014 | Nelson | Jan. 3, 1950 |